United States Patent [19]

Nuckolls et al.

[11] Patent Number: 4,891,562
[45] Date of Patent: Jan. 2, 1990

[54] HYBRID REGULATOR-BALLAST CIRCUIT FOR HIGH INTENSITY DISCHARGE LAMPS

[75] Inventors: Joe A. Nuckolls, Blacksburg; Paul J. Buckley, II, Christiansburg, both of Va.

[73] Assignee: Hubbell Incorporated, Orange, Conn.

[21] Appl. No.: 134,459

[22] Filed: Dec. 16, 1987

[51] Int. Cl.$^4$ ............................................ H05B 41/16
[52] U.S. Cl. ..................................... 315/277; 315/276; 315/307; 315/224
[58] Field of Search ............... 315/308, 307, 324, 347, 315/276, 277, 278

[56] References Cited

U.S. PATENT DOCUMENTS

| | | | |
|---|---|---|---|
| 4,501,994 | 2/1985 | Spreadbury | 315/307 |
| 4,503,364 | 3/1985 | Engel | 315/308 |
| 4,562,384 | 12/1985 | Owen | 315/278 |
| 4,609,852 | 9/1986 | Perper | 315/276 |
| 4,612,480 | 9/1986 | Kneisel | 315/224 |
| 4,754,201 | 6/1988 | Knoble et al. | 315/247 |
| 4,795,945 | 1/1989 | Mayer | 315/276 |

Primary Examiner—Palmer C. DeMeo
Assistant Examiner—Brian Palladino
Attorney, Agent, or Firm—Jerry M. Presson; Walter C. Farley

[57] ABSTRACT

A regulator circuit for a high intensity discharge lamp includes a magnetic regulator having three windings, the primary and second thereof being connected to line voltage and a lamp. The tertiary winding is connected to a storage capacitor and to a reactor circuit having an inductive reactor and a semi-conductor switch in series. Lamp voltage and current signals are derived by a control circuit which turns the semi-conductor switch on at specific times in each half cycle of operation. The firing angle of the switch is altered to regulate the lamp operating characteristics despite line voltage changes and operating voltage variations resulting from lamp aging and other factors. The control circuit can also be operated as a lamp dimmer circuit.

10 Claims, 5 Drawing Sheets

HYBRID REGULATOR-BALLAST CIRCUIT FOR HIGH INTENSITY DISCHARGE LAMPS

This invention relates to an improved hybrid ballast for a high intensity discharge (HID) lamp using a magnetic regulator in combination with electronic control circuitry.

BACKGROUND OF THE INVENTION

It is well known that an HID lamp requires some form of ballast to regulate its operating voltage and wattage because of the negative resistance characteristics of the lamp. The usual ballast has been of a reactive type. The general objective of a regulating ballast is to cause the lamp to operate at its design wattage even when the line voltage varies over a range of, for example, plus or minus 10%, or when aging of the lamp causes an increase in lamp operating voltage which, in turn, usually causes an excessive increase in the power dissipated by the lamp.

A magnetic regulator ballast can provide reasonably good control of the lamp wattage over a reasonable range of line voltages and within the allowable range of lamp voltage variations, but it is not capable of holding the lamp wattage at the true design level and also has some other disadvantages including the lack of simple adjustability of the lamp operating wattage which means that it cannot be used as the basis for a dimming ballast or an energy management lamp control circuit. Accordingly, efforts have been made to combine electronic control circuitry with a magnetic regulator to arrive at a so-called "hybrid" ballast which has much improved control. One example of such a circuit is shown in U.S. Pat. No. 4,501,994, Spreadbury.

These efforts have not been entirely successful. The magnetic regulator remains superior as to such considerations as line power factor, lamp operating current crest factor and lumen maintenance, lamp stability at higher line and lamp voltages, tolerance to line voltage dips and other factors. Notably, some hybrid circuits have allowed the lamp wattage to exceed rated values at high line voltage and to fall below ratings at moderately low line voltages, thereby allowing the light output of the lamp to be too low. Others have exhibited poor stability, short lamp life, high losses and other problems including the production of very high line harmonics.

SUMMARY OF THE INVENTION

Accordingly, an object of the present invention is to provide an improved hybrid control circuit which employs a magnetic regulator in conjunction with an energy transfer circuit to achieve flexible and efficient lamp control and system high performance.

A further object is to provide such a circuit which exhibits good regulation of the lamp power, light output and operating voltage despite variations in line voltage and in the lamp operating voltage as a function of aging. Yet another object is to provide such a circuit which controls the power supplied to the lamp so that the circuit can be used as a lamp dimmer.

Briefly described, the invention includes a regulator circuit for controlling the operation of a high intensity discharge lamp in which the lamp operating voltage may vary as a function of lamp age and line voltage fluctuations. The circuit includes a magnetic regulator having a primary winding, a secondary winding, a tertiary capacitor winding and magnetically permeable means for magnetically coupling the windings to each other, the primary winding being connectable to a line voltage source. A storage capacitor is connected in parallel with the tertiary winding and a reactor circuit is connected in parallel with a portion of the tertiary winding, the reactor circuit including an inductive reactor and a gate-controlled semi-conductor switch having a switchable conductive path connected in series with the inductive reactor and having a gate. The secondary winding of the regulator is connected to the lamp and to means for producing a signal representative of an electrical lamp operating characteristic. A control circuit has an output connected to provide a trigger signal to the gate of the semi-conductor switch and an input connected to receive a signal representative of the lamp operating characteristic for causing the switchable path to become conductive at a time in each half cycle which is a function of the lamp operating parameters such as voltage such that the trigger signal occurs earlier in each half cycle as the operating characteristic increases.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification and wherein.

DESCRIPTION OF THE PREFERRED EMBODIMENT

The invention will be described in the context of an embodiment of a regulator for which the circuit values and the like are selected to regulate the operation of a 400 watt high pressure sodium lamp. It will be recognized, however, that various circuit parameters can be readily changed to accommodate other wattages and also other types of high intensity discharge lamps, and the circuit can readily be adapted to control types of lamps other than HID.

Figure 1:
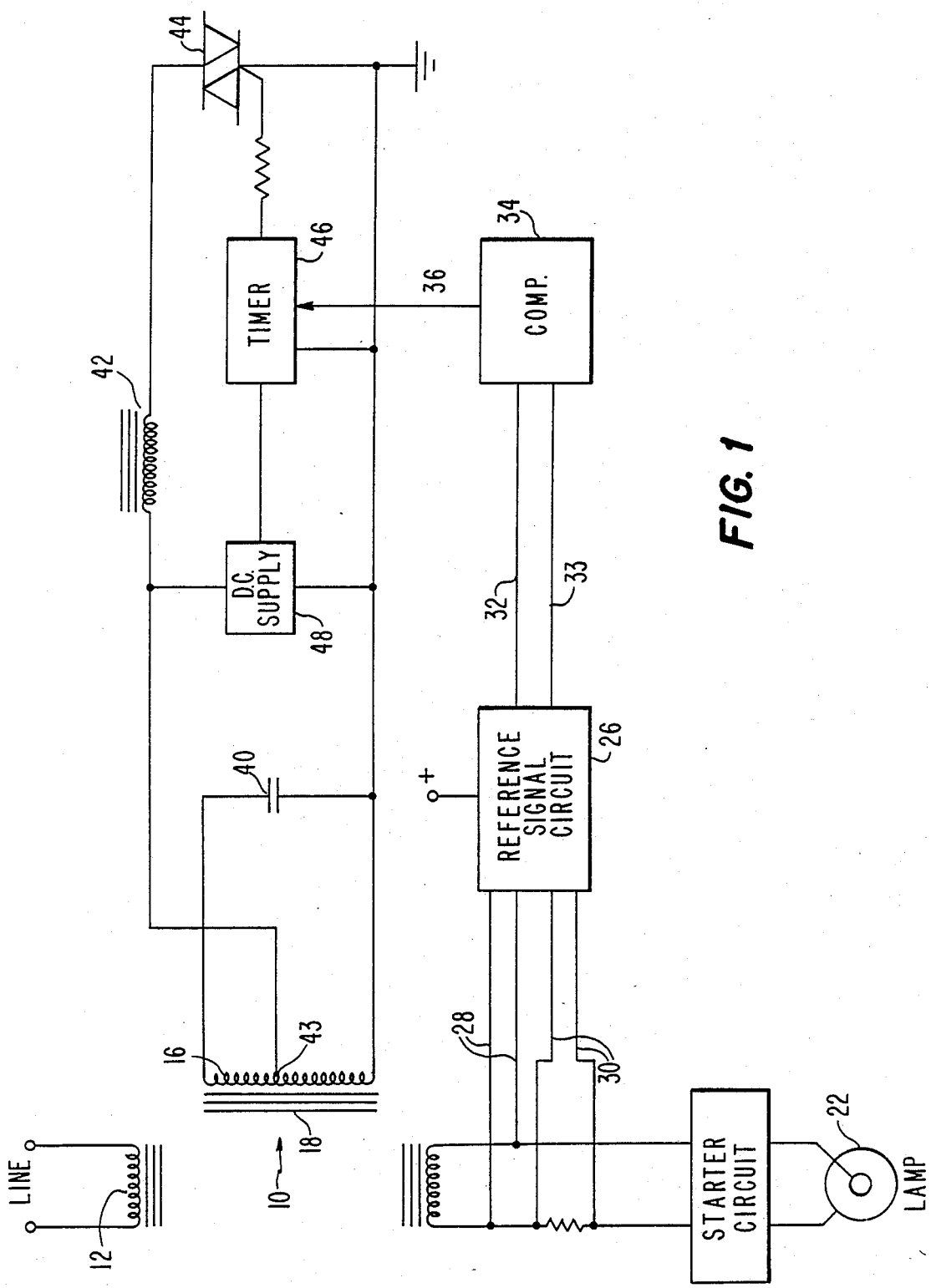
FIG. 1 is a schematic block diagram of a regulator circuit in accordance with the invention.

The overall circuit arrangement is shown in FIG. 1 wherein a magnetic regulator indicated generally at 10 includes a primary winding 12 which is connectable to line voltage, in this case 120 volts AC, a secondary winding 14 and a tertiary winding 16, all coupled together by a laminated core 18. The secondary winding 14 is connected to a starter circuit 20 for providing high voltage pulses to start the lamp. The starter circuit is conventional in nature and will not be described in detail. The secondary winding is also connected to a lamp socket 22 for receiving the lamp, the operation of which is to be controlled. A small value resistor 24 is connected in series between the secondary winding 14 and the lamp to facilitate producing a signal representative of lamp operating current. A reference signal circuit 26 has inputs connected by wires 28 to secondary winding 14 for the purpose of detecting the lamp operating voltage and a current input connected by wires 30 across resistor 24 which can have a value in the order of 0.1 ohms.

Reference signal circuit 26 employs the voltage and current input signals to produce a signal representative of lamp voltage and lamp operating power, these signals being applied on conductors 32 to a comparator circuit 34. The result of this comparison is supplied as a control signal on conductor 36.

At this point, it should be mentioned that the control signal in the embodiment being described is proportional to the lamp wattage. However, it is possible to derive a signal representative of this wattage in a variety of ways, the particular technique employed herein being one practical, and quite satisfactory, technique.

A storage capacitor 40 is connected across the ends of tertiary winding 16. An inductive reactor 42 has one end connected to a tap 43 on winding 16, the other end of reactor 42 being connected to one side of a gate controlled semi-conductor switch such as a triac 44, the other side of which is connected to the finish end of tertiary winding 16. The gate electrode of triac 44 is connected to the output of a timer circuit 46 which receives the control signal on conductor 36 as an input. A DC supply circuit 48 is connected across the tapped portion of winding 16, between tap 43 and the finish portion of the winding, to provide a low DC voltage to timer 46 and control circuitry.

As will be recognized, when the switchable conductive path of triac 44 is in its non-conductive state, reactor 42 is essentially removed from the circuit. The circuit thus operates as a magnetic regulator. Energy is extracted from the line through the magnetic coupling and magnetically passed to storage capacitor 40 which, for the lamp in question, can have a value of approximately 22 microfarads. This energy is transferred at the rate of about 2.5 to 3 joules per half cycle with about 10 to 20 percent being passed directly to the lamp. A large portion of the energy stored in the capacitor is then passed to the lamp load through the leakage reactance of the secondary. Leading current charges the power capacitor.

The magnitude of the power capacitor 40 has a value of about 22 microfarads, about 16% larger than the 19 microfarad capacitor which would ordinarily be used in a magnetic regulator ballast, which allows a 400 watt lamp to be driven at about 500 watts or more. This gives the circuit the ability to push the lamp operating wattage to 400 watts or greater when the input voltage is low and/or the lamp voltage runs low. The triac control must have the control range capability to compensate for circumstances which produce low lamp operating wattage or high operating wattage conditions. The feedback is basically lamp volt-amperes but is weighted slightly toward voltage so as to cause the lamp operating wattage to follow lamp voltage rise, thereby offsetting the lamp lumen depreciation with life.

When timer 46 activates triac 44 and makes it conductive, this connects reactor 42 into the circuit with the tertiary winding, along with the capacitor, to extract the negative volt-amperes and store that energy as positive volt-amperes in the reactor each half cycle, thereby reducing the amount of capacitor-stored energy available to be passed on to the lamp load.

From this, it will be recognized that timer 46 must be operated to energize triac 44 so that it has minimum effect when the lamp power is at the desired level. However, when the lamp wattage becomes too high because of increased (or decreased) line voltage or because of high operating lamp voltage resulting from an aging lamp, the timer should be activated earlier (or later) in each half cycle so that the reactor 42 can perform its storage function for a greater (or lesser) part of that half cycle. Stated differently, as lamp wattage increases, the firing angle of triac 44 with respect to the voltage half cycle should be reduced, causing the triac to fire earlier.

This is accomplished by producing a control signal on conductor 36 which increases with wattage and which causes the timer 46 to produce an output trigger signal earlier in each half cycle as the control signal increases.

Figure 2:
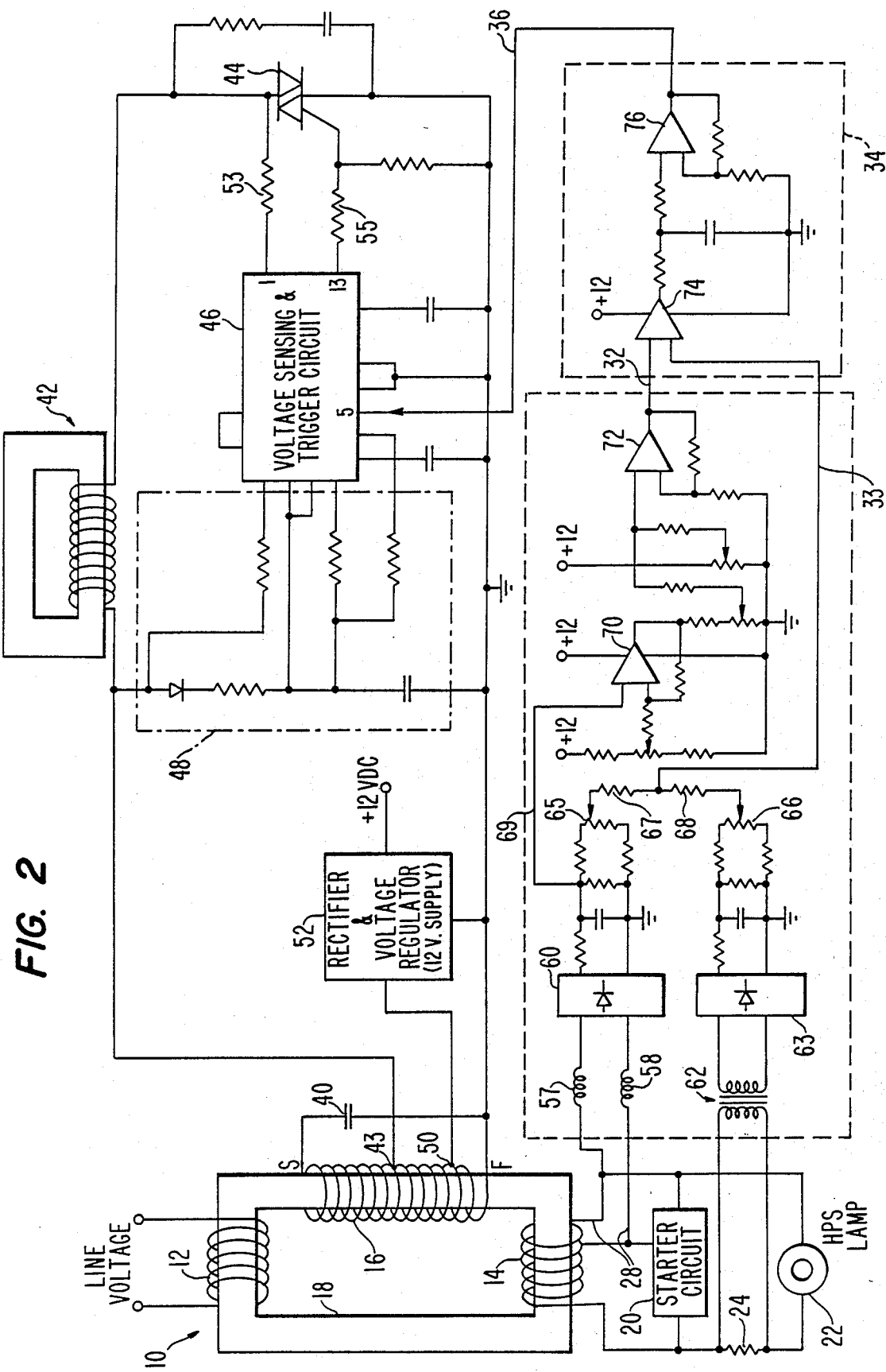
FIG. 2 is a more detailed schematic diagram, partly in block form, of a regulator circuit usable in the block diagram of FIG. 1.

The manner in which this is accomplished can be seen more clearly by referring to the more detailed schematic diagram of FIG. 2. As seen therein, the magnetic regulator 10 is a 400 watt 120 volt magnetic regulator having the windings as generally described in connection with FIG. 1. In addition to the circuit features discussed in connection with FIG. 1, the tertiary winding is also provided with a tap 50 which is connected to a rectifier and voltage regulator 52 which constitutes a 12 volt DC supply for the various electronic components used in the reference signal circuit and comparator.

The timer 46, identified more fully as a voltage sensing and trigger circuit in FIG. 2, conveniently comprises an integrated circuit of a type commonly used for motor control. This integrated circuit can be a type TOA1085C, made by Plessey Corporation. The circuit has an input pin 1 connected through a resistor 53 to the anode side of the triac for the purpose of sensing triac voltage. This integrated circuit senses when current stops flowing through the triac each half cycle and commences a timing interval. At the end of the timing interval, a trigger signal is produced at pin 13 and coupled through a resistor 55 to the gate electrode of the triac, turning it on. The duration of this timing interval is controlled by the control signal supplied on conductor 36 to pin 5 of the integrated circuit.

Conductors 28 which carry the voltage input to reference signal circuit 26 are connected through RFC chokes 57 and 58 to a full-wave rectifier circuit 60. Chokes 57 and 58 prevent high voltage lamp starting pulses from the regulator and starter circuit from entering the reference signal circuit Similarly, conductors 30 are connected to a coupling step-up transformer 62, the secondary winding of which is connected to a rectifier circuit 63. The outputs of rectifier circuits 60 and 63 are coupled through resistive-capacitive filter circuits to potentiometers 65 and 66, respectively, the movable contacts of which are connected to substantially identical resistors 67 and 68 which are connected together, conductor 33 being connected to the junction thereof to carry a signal to one input of comparator 34 A voltage signal from the output of rectifier 60 is connected on a conductor 69 to one input of a summing amplifier 70 the other input of which is supplied from a voltage divider connected to the 12 volt source. Summing amplifier 70 produces a signal which is representative of the lamp operating voltage, this signal being amplified by an amplifier 72 and supplied on conductor 32 to the other input of the comparator circuit Comparator circuit 34 includes a comparator amplifier 74 and an output amplifier 76 which supplies the control signal on conductor 36.

The voltage supplied on conductor 69 is representative of lamp operating voltage and the signal supplied on conductor 33 is a function of lamp operating wattage but the level of the signal on conductor 33 is selectable by the adjustment of potentiometer 65 and 66. It is also possible to include switches to insert or remove resistors in the circuit to control the level of the signal on conductor 33 in steps for dimming purposes The incorporation of these potentiometer allows the establishment of a specific operating range midpoint which, normally, would be selected to be the design center of the power curve for the lamp being controlled. However, this circuit also permits an additional function, namely, a dimming function for the HPS lamp inserted into socket 22. By simply altering the resistance characteristics of the network between rectifiers 60 and 63 and conductor 33, the lamp lumen output can be smoothly controlled over a substantial range. The operation of the overall circuit is as described in connection with FIG. 1.

Figure 3:
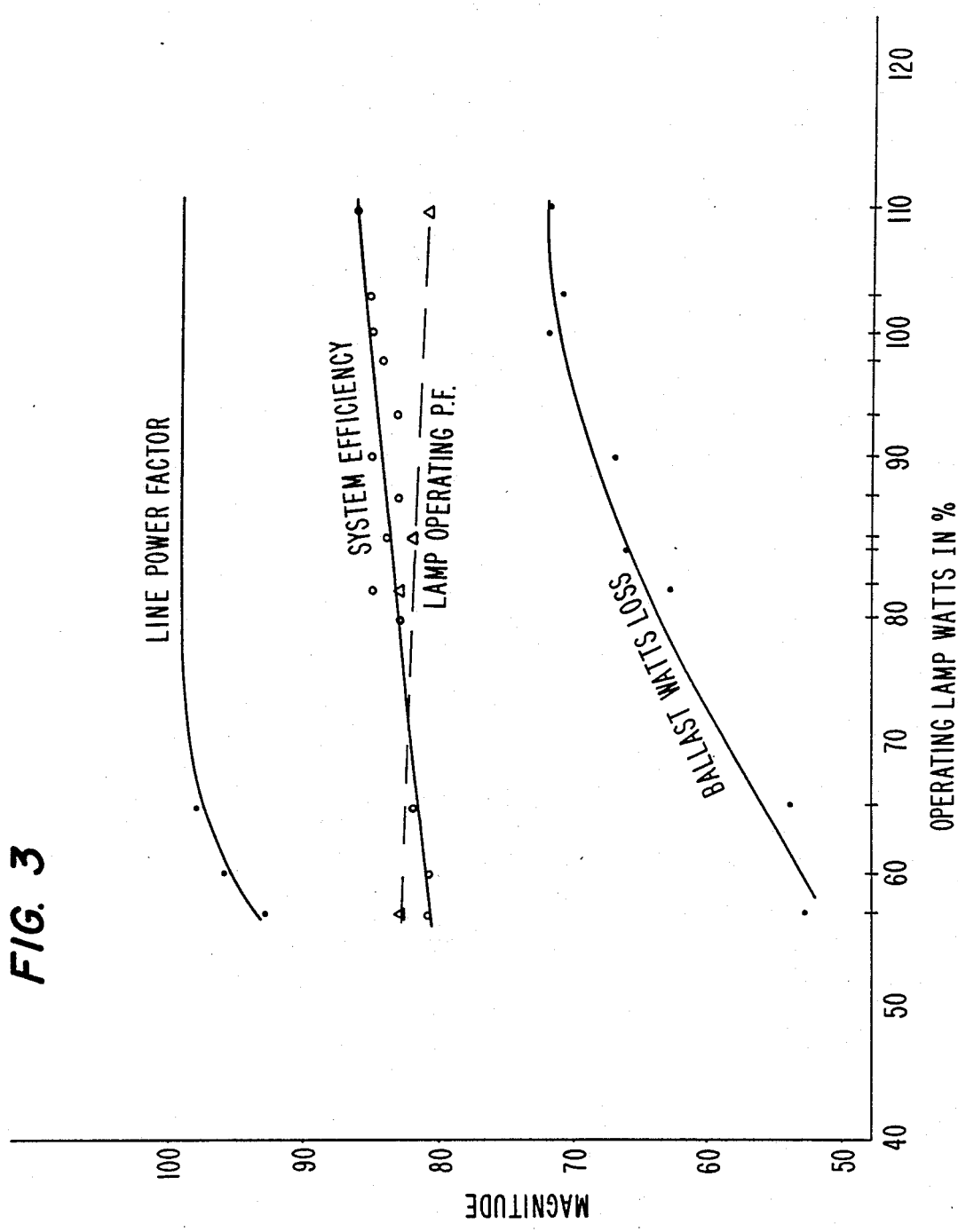
FIGS. 3, 4 and 5 are curves of operating characteristics showing the performance of the circuit of FIG. 2.
Figure 4:
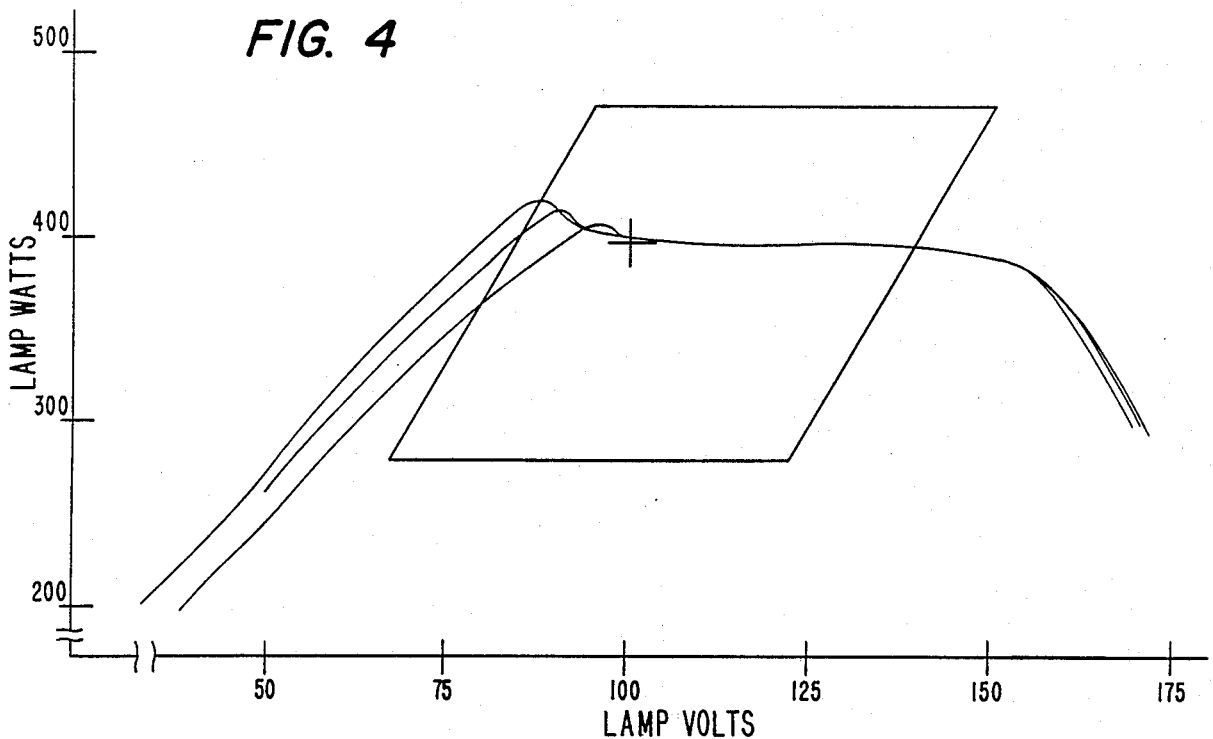
Figure 5:
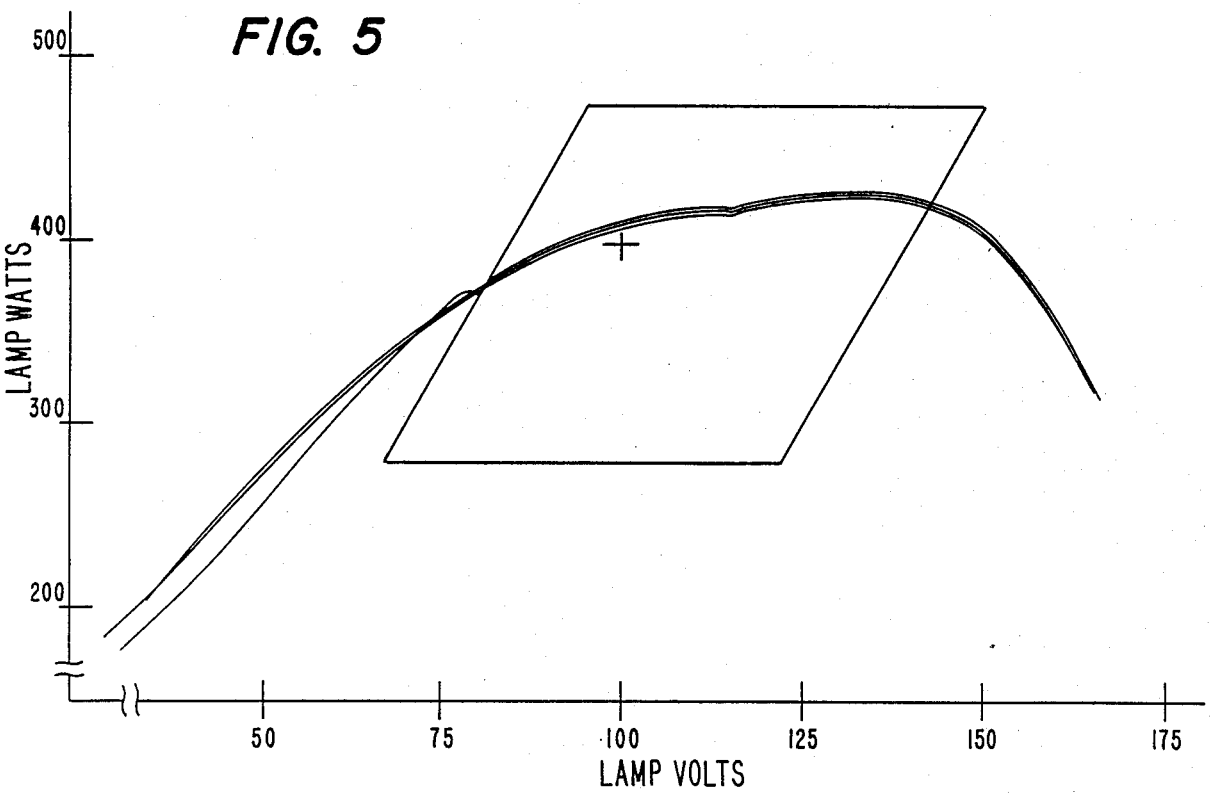

FIGS. 3, 4 and 5 are graphical representations of characteristics of the circuit of FIG. 2. FIG. 3 shows several of the operating characteristics of the circuit, the horizontal axis of this figure being the operating lamp wattage in percentage of design wattage and the vertical axis being magnitude of the various characteristics in the appropriate units. It will be observed that the power factor is near 100% over a wide operating range of the lamp wattage variations, that the system efficiency exceeds 80% over the entire anticipated operating range and that the lamp operating power factor also remains above 80%. Finally, these data indicate that the loss in the ballast remains below 75 watts through the operating range. As compared with devices of the prior art, these are particularly good operating characteristics, especially when considered with the excellent regulation characteristics shown in FIGS. 4 and 5.

In each of FIGS. 4 and 5, the lamp wattage is plotted as a function of lamp voltage for three line voltages, i.e., the nominal design line voltage and line voltages at plus and minus 10%. Within most of the operating range identified by the trapezoid, the regulation is so effective that the three voltage lines are almost indistinguishable from each other. The trapezoid represents the operating limits defined by the American National Standards Institute (ANSI) within which an HPS lamp must be operated. Exceeding the upper limit would result in vastly reduced lamp life while falling below the lower limit would produce inadequate light and poor color. The optimum operating point for a new 400 watt lamp is at the cross marked at 400 watts and 100 lamp volts.

FIG. 4 represents an adjustment of the feedback in circuit 26 to achieve the flattest response, i.e., regulation which tracks the 400 watt line over the greatest portion of the lamp operating voltage. FIG. 5 shows an adjustment of the feedback to provide an increasing level of wattage with increasing lamp voltage, an operating characteristic which can be selected to provide improved color and light output as the lamp ages.

Figure 6:
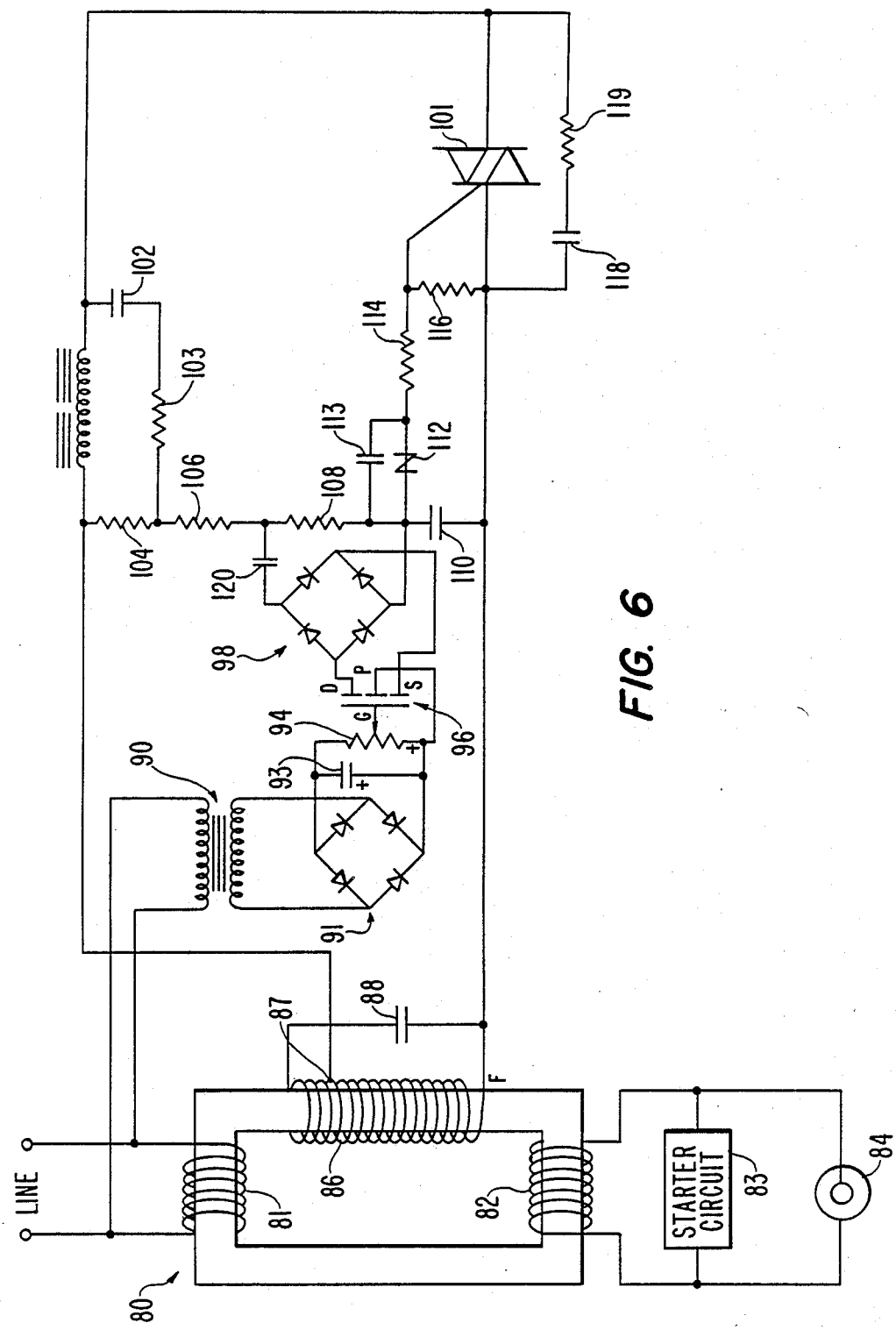
FIG. 6 is a schematic circuit diagram of a further embodiment of a regulator circuit in accordance with the invention.

FIG. 6 shows a further embodiment of a regulating and control circuit in accordance with the invention. A transformer 80, which is similar to transformer 10, has a primary winding 81, a secondary winding 82 which is connected to a starter circuit 83 and the lamp socket 84, and a tertiary winding 86 with a 22 microfarad storage capacitor 88 connected across the tertiary winding. The values given for this circuit are for use in connection with a 400-watt HPS lamp, as before.

Primary winding 81 is connectable to line voltage and the line voltage is also connected to the primary winding of a step-down transformer 90, the secondary winding of which is connected to the AC terminals of a full-wave bridge rectifier indicated generally at 91. Transformer 90 is in the nature of a doorbell transformer and provides an output which is on the order of 10 volts, depending upon the magnitude of the line voltage.

The DC output of rectifier 91 is connected across a filter capacitor 93 and a feedback adjustment potentiometer 94 having a maximum resistance of about 10k ohms. The movable contact of potentiometer 94 is connected to the gate electrode of a four terminal, field-effect transistor (FET) 96, the plate electrode of which is connected to the positive end of potentiometer 94. The source and drain electrodes of FET 96 are connected to the DC terminals of a fullwave, bridge rectifier indicated generally at 98.

At nominal line voltage, the voltage across winding 86 and capacitor 88 is approximately 515 volts AC RMS. A tap 87 at 243 V. is provided to drive the reactor and control circuit, this tap being connected to a reactor 100 which is designed to provide an inductance of 130 mH at 3.6 amperes. In series with the reactor is the switchable conductive path of a triac 101, such as a SC141D triac, the other terminal of the triac being connected to the finish end of winding 86.

A series circuit including a capacitor 102 and resistors 103 and 104 form an integrating network placed across the reactor to help stabilize the ampere-second symmetry of the triac and to prevent triac firing before a zero current point is reached.

A 2200 ohm resistor 106 and a 180 K ohm resistor 108 are connected in series circuit relationship with a 0.22 microfarad trigger capacitor 110 between the reactor circuit and the finish side of winding 86. This forms a charging circuit to develop a trigger voltage which can activate the triac. Capacitor 110 is connected to the gate electrode of the triac through a breakdown diode 112 having a 100 picofarad shunt capacitor 113, and a series resistor 114. A shunt resistor 116 and a series circuit including capacitor 118 and resistor 119 are connected across the triac to assist with commutation thereof and turn on stabilization. Breakdown diode 112 is selected to have a breakdown voltage of about 20 volts.

The charging circuit for capacitor 110 includes resistors 104, 106 and 108 but also includes rectifier 98 which is connected across resistor 108 in series with a 0.033 microfarad capacitor 120 which provides feedback linearity and limiting. The capacitor and rectifier circuit across resistor 108 are connected to FET 96 which acts like a variable resistance, the effective resistance of which is a function of the voltage between the gate and plate electrodes thereof. This voltage, which is selectable by the setting of potentiometer 94 but which, at any setting, is proportional to the line voltage magnitude, thus controls the rate at which capacitor 110 is charged. Whenever the voltage across capacitor 110 reaches the 20 volt breakdown level of diode 112, the capacitor is discharged and triac 101 is fired. The firing angle is thus determined directly by feedback from the line voltage. As the line voltage rises, the DC voltage developed across capacitor 93 also rises which changes the bias on the FET transistor, causing the drain-to-source current to increase. This causes the trigger capacitor 110 to charge more quickly, thus firing triac 101 at an earlier point in the half cycle, causing the current flow through the reactor, and thereby the energy stored in the reactor, to increase at the expense of that energy stored on storage capacitor 88. Thus, an increase in line voltage is offset by the increased energy storage of reactor 100 and the lamp power is held constant As will be apparent, if the line voltage drops, the reverse process occurs.

As with the other embodiment, this circuit is an excellent lamp wattage regulator. It is also possible to use other characteristics than line voltage to provide the feedback Actual light output of the lamp can be employed as well as actual lamp wattage or ambient light.

This approach can also serve as an excellent fluorescent lamp control and dimming system when designed for that type of lamp.

While certain advantageous embodiments have been chosen to illustrate the invention, it will be understood by those skilled in the art that various changes and modifications can be made therein without departing from the scope of the invention as defined in the appended claims.

What is claimed is:

1. A regulator circuit for controlling and regulating the operation of a high intensity discharge lamp having electrical operating characteristics which vary as a function of lamp operating variables, manufacturing tolerances and line voltage fluctuations, the circuit comprising a magnetic regulator having first, second and third winding portions and magnetically permeable means for magnetically coupling said winding portions to each other, said first winding portion being connectable to a line voltage source and said second winding portion being connectable to a high intensity discharge lamp;

a storage capacitor connected in parallel circuit relationship with said third winding portion;

a reactor circuit connected in parallel with at least a portion of said magnetic regulator, said reactor circuit including
an inductive reactor for extracting stored energy from said storage capacitor, and
a gate-controlled semiconductor switch having a switchable conductive path connected in series circuit relationship with said reactor and having a gate;

circuit means for producing a signal representative of a lamp operating parameter; and control circuit means having an output connected to provide a trigger signal to said gate and an input connected to receive said signal representative of said lamp operating parameter for causing said switchable path to become conductive at a time in each half-cycle which is a function of said lamp operating parameter whereby the time at which said trigger signal is provided is earlier as said lamp operating parameter is greater and later as said lamp operating parameter is smaller.

2. A circuit according to claim 1, wherein said parameter is line voltage.

3. A regulator circuit for controlling and regulating the operation of a high intensity discharge lamp having electrical operating characteristics which vary as a function of lamp operating variables, manufacturing tolerances and line voltage fluctuations, the circuit comprising a magnetic regulator having first second and third winding portions and magnetically permeable means for magnetically coupling said windings to each other, said first winding portions being connectable to a line voltage source and said second winding portion being connectable to a high intensity discharge lamp;

a storage capacitor connected in parallel circuit relationship with said third winding;

a reactor circuit connected in parallel with at least a portion of said third winding, said reactor circuit including
an inductive reactor for extracting stored energy from said storage capacitor, and
a gate-controlled semiconductor switch having a switchable conductive path connected in series circuit relationship with said reactor and having a gate;

circuit means for producing a signal representative of a lamp operating parameter; and control circuit means having an output connected to provide a trigger signal to said gate and an input connected to receive said signal representative of said lamp operating parameter for causing said switchable path to become conductive at a time in each half-cycle which is a function of said lamp operating parameter whereby the time at which said trigger signal is provided is earlier as said lamp operating parameter is greater and later as said lamp operating characteristic is smaller.

4. A circuit according to claim 3, wherein said lamp operating characteristic is lamp power.

5. A circuit according to claim 4, wherein said circuit means for producing a signal includes means connected across said lamp for producing a signal representative of lamp operating voltage, a low value resistor connected in series with said lamp, circuit means connected across said resistor for obtaining a signal representative of lamp operating current, and means for combining said voltage and current signals.

6. A circuit according to claim 5, wherein said means for combining includes first and second rectifier circuits for rectifying said signals representative of voltage and current, respectively;

first and second potentiometer connected respectively to the outputs of said first and second rectifier circuits, said potentiometer having movable contacts;

a resistive network connected between said movable contact, said network having a midpoint connection; and a comparator circuit having one input connected to said midpoint connection.

7. A circuit according to claim 6 and further comprising means for establishing a reference signal and for providing said reference signal to the other input of said comparator circuit, the output of said comparator circuit forming said control signal, said potentiometer being adjustable to set the operating power level for said lamp.

8. A method of operating a regulator circuit for regulating the operation of a high intensity discharge lamp having variable electrical operating parameters, the circuit being of the type including a magnetic regulator having a primary winding, a secondary winding, a tertiary capacitor winding and magnetically permeable means for magnetically coupling said windings to each other, the primary winding being connectable to a line voltage source and the secondary winding being connectable to a high intensity discharge lamp and a storage capacitor connected in parallel circuit relationship with the tertiary winding, the method comprising the steps of connecting a reactor circuit in parallel circuit relationship with at least a portion of the tertiary winding, the reactor circuit including an inductive reactor and a gate-controlled semiconductor switch having a switchable conductive path connected in series circuit relationship with the reactor, producing a signal representative of an electrical lamp operating parameter; and providing a trigger signal to the gate of the semiconductor switch in each half cycle of line voltage for causing the switchable path to become conductive at a time in each half-cycle which is a function of the lamp operating parameter whereby the time at which the trigger signal is provided is earlier as the lamp operating parameter is greater and later as the lamp operating parameter is smaller.

9. A method according to claim 8, wherein said parameter is lamp operating power.

10. A method according to claim 8, wherein said parameter is line voltage.

* * * * *